(No Model.)

G. DELAGE.
AMALGAMATOR.

No. 521,145. Patented June 5, 1894.

WITNESSES:
G. J. Rollandet
Chas. E. Dawson

INVENTOR
Gideon Delage
BY A. J. O'Brien
ATTORNEY

UNITED STATES PATENT OFFICE.

GIDEON DELAGE, OF SALIDA, COLORADO.

AMALGAMATOR.

SPECIFICATION forming part of Letters Patent No. 521,145, dated June 5, 1894.

Application filed December 11, 1893. Serial No. 493,359. (No model.)

*To all whom it may concern:*

Be it known that I, GIDEON DELAGE, a citizen of the United States of America, residing at Salida, in the county of Chaffee and State of Colorado, have invented certain new and useful Improvements in Amalgamators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in amalgamators, and the same consists of the features hereinafter described and claimed, all of which will be fully understood by reference to the accompanying drawings in which is illustrated an embodiment thereof.

Figure 1:
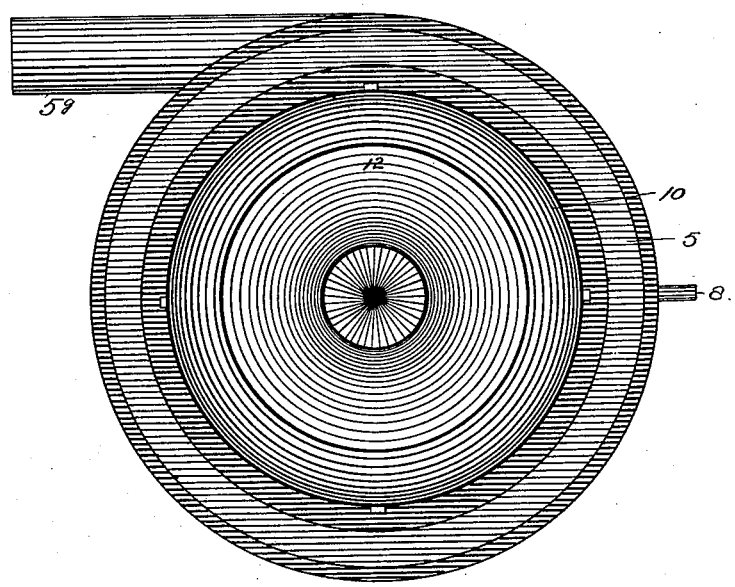
Figure 2:
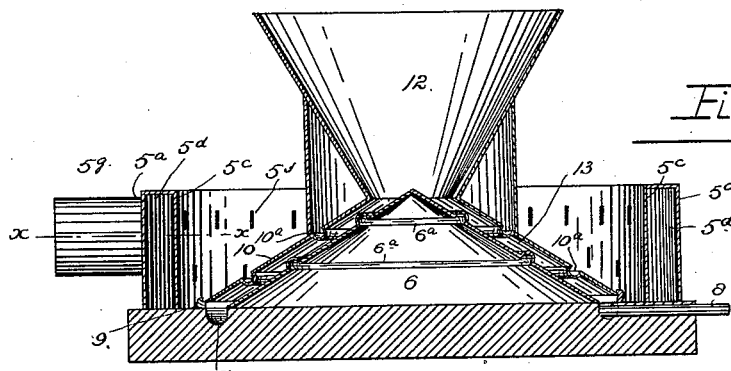
Figure 3:
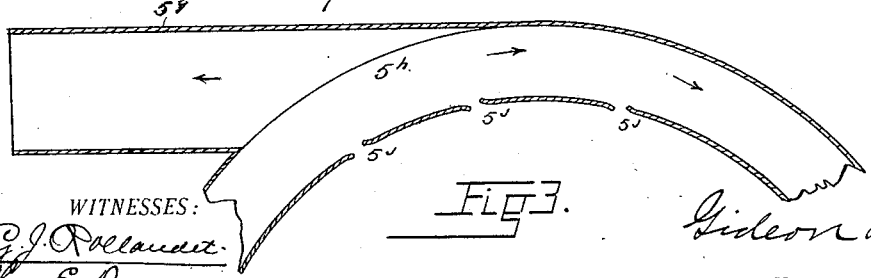

In the drawings, Figure 1 is a top or plan view of the device. Fig. 2 is a vertical section taken through the center thereof. Fig. 3 is a fragmentary, horizontal section taken on the line $x$—$x$, Fig. 2.

Similar reference characters indicating corresponding parts or elements in these views, let the numeral 5 designate the circular tank provided with the outer rim $5^a$ and the inner apertured rim $5^c$ inclosing a chamber $5^d$ located between the two rims. The outer rim is provided with an opening $5^h$ for the introduction of water to the chamber $5^d$ through a pipe $5^g$ which is so located that the water introduced therethrough is discharged tangentially to the outer wall of the inner rim, whereby a current is induced in the chamber $5^d$ in the direction indicated by the arrows. The rim $5^c$ is provided with apertures $5^j$ whose mouths are shaped as shown in Fig. 3 whereby a current is induced in the water in the body of the tank having the same direction as that in the chamber $5^d$.

Centrally located in the tank 5 is the cone 6 provided with the horizontal, circumferential riffles $6^a$. The surface of the cone is composed of amalgamated copper. Surrounding the base of the cone is a groove 7 formed in the bottom of the tank, for the reception of mercury adapted to form an amalgam with the precious metals, if any, which escape the amalgamated surface of the cone. The contents of this groove or pocket are drawn off through a suitable channel formed in the base of the tank and normally closed by a stop 8.

Covering the cone 6, and suitably supported above the bottom of the tank on the lugs 9, is the hollow amalgamated cone 10 open at the top for the reception of the material to be treated which is discharged through the funnel-shaped mouth 12 made fast to the top of the hollow cone. The lugs 9 are of such height as to support the cone 10 a short distance above the bottom of the tank and the cone 6, whereby a passage way 13 is left between the two cones for the passage of the material discharged into the mouth 12, and whereby a communication is formed between said passage and the main chamber of the tank. The cone 10 is provided with exterior circumferential depressions $10^a$ which form interior riffles projecting into the passage 13.

The material to be treated must be suitably screened previous to its discharge into the mouth 12. This material, when fed to the machine, is mingled with a suitable quantity of water, which, together with the gangue, passes from the channel 13 into the main chamber of the tank, where a rotary motion is imparted thereto by the water introduced through the pipe $5^g$ and discharged into the main chamber of the tank through the apertures $5^j$ as heretofore described. This motion imparted to the material causes sufficient agitation to effect a thorough separation between the gangue and the metals which have escaped from the passage 13, the metals being saved by reason of their affinity for the mercury in the tank, while the gangue is discharged from the tank with the water which overflows its rim.

Having thus described my invention, what I claim is—

1. In an amalgamator, the combination of the tank having the outer rim provided with a tangential inlet, the inner perforated rim, the two rims being suitably separated to form a chamber, and the conical bottom, the hollow cone covering the conical bottom of the tank and suitably separated therefrom to form a passage way between the two cones and thence to the main chamber of the tank, whereby a rotary movement is imparted to the material in the tank, substantially as described.

2. In an amalgamator, the combination of the tank having two rims suitably separated to form a chamber, the inner rim being perforated as described, and the outer rim provided with an inlet pipe, the stationary cone centrally located in the tank, the circumferential groove formed in the bottom of the tank around the cone, the hollow cone covering the bottom cone and suitably separated therefrom, the outer cone being provided with an inlet opening at the top, substantially as described.

3. In an amalgamator, the combination of the tank having the inner and outer chambers, the two counterpart cones centrally arranged in the tank and suitably separated, a feed opening in the outer cone, and tangential inlets for introducing water to the two chambers of the tank, whereby a rotary motion is imparted to the contents of the tank, substantially as described.

In testimony whereof I affix my signature in the presence of two witnesses.

GIDEON DELAGE.

Witnesses:
G. J. ROLLANDET,
CHAS. E. DAWSON.